UNITED STATES PATENT OFFICE.

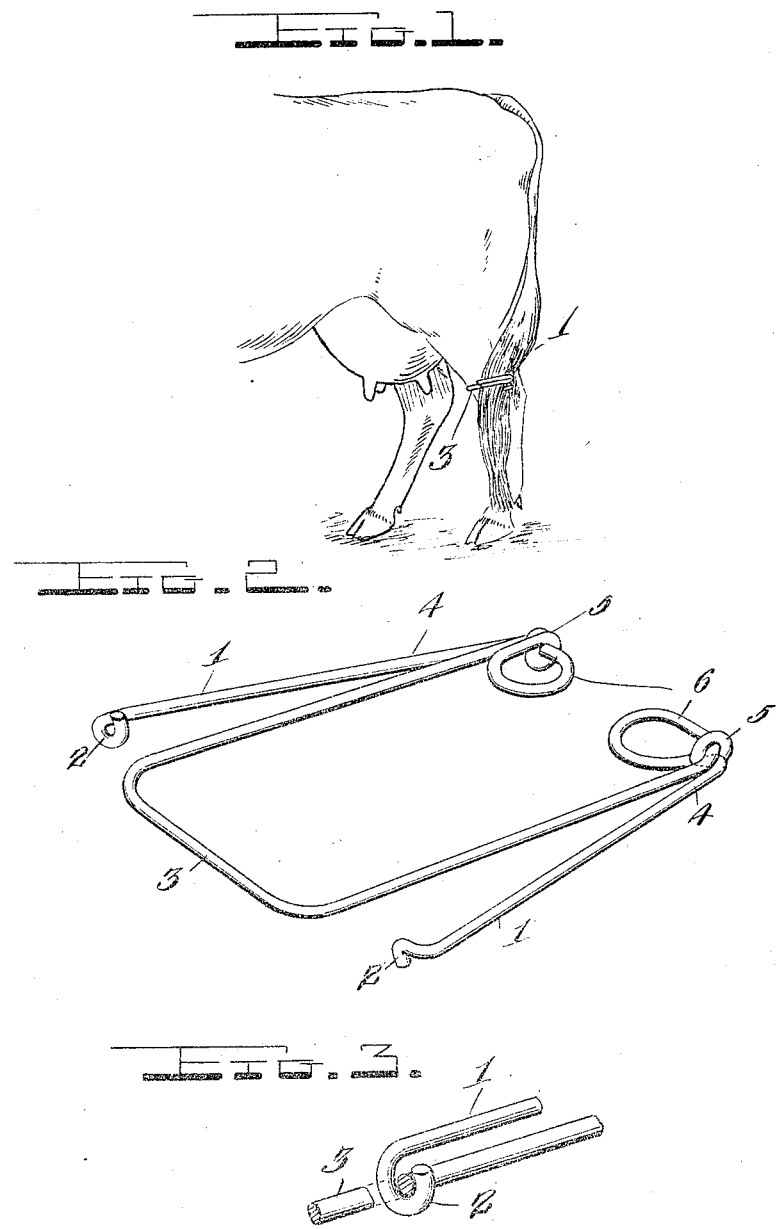

ARTHUR L. BARTLETT, OF UNADILLA, NEW YORK.

COW-TAIL HOLDER.

1,013,362.     Specification of Letters Patent.     Patented Jan. 2, 1912.

Application filed May 15, 1911. Serial No. 627,279.

*To all whom it may concern:*

Be it known that I, ARTHUR L. BARTLETT, a citizen of the United States, residing at Unadilla, in the county of Otsego and State of New York, have invented certain new and useful Improvements in Cow-Tail Holders, of which the following is a specification, reference being had to the accompanying drawings.

This invention relates to cow tail holders and has for its object to provide a simple and convenient device for holding a cow's tail, adapted to be used when the animal is being milked, to prevent the tail from being switched into the milk or into the face of the milker.

Another object of this invention is to arrange this holder so that it can be readily applied to the leg of an animal, or detached therefrom and at the same time will be positive in action.

A further object of the invention is to have this holder made from one piece of wire, and of such a form as to be readily and cheaply manufactured.

A still further object of this invention is to have projections arranged on this device so that the same will have means provided thereon to keep it substantially in place, so that it will not lose its position on the leg of the animal.

Other objects of the invention will become apparent as it is more fully set forth.

The device consists of a piece or length of spring wire bent to a shape to conform with the leg of the animal at the portion above the knee, that is the location to which the cow's tail extends, in order to clamp it in this place and keep it from twisting and flying about.

In the accompanying drawings which illustrate by way of example an embodiment of this invention, Figure 1 represents a cow tail holder attached to the hind leg of a cow; Fig. 2 is a detail of the holder; and Fig. 3 is a detail of the hooking attachment for keeping the clamping arm in position.

Similar reference characters refer to similar parts throughout the drawings.

The holder is formed from a single piece of wire and has each end 1 formed with hooks 2 which engage with the U-shaped body 3 of the holder which is arranged to engage with the leg of the animal. The end portions 1 are disposed at the end with arms 4 which have their ends coiled around the upper portion 5 of the U-shaped body 3 and a ring 6 is formed at this portion, in order that the U-shaped body will be held securely on the leg of the animal, when the same has been placed thereon.

The rings 6 will assist in giving a resilient action to the arms 4 and tend to keep them outwardly disposed, so that when the hooks 2 are placed in the U-shaped body, they will clamp there tightly. Further details of this invention can be noted by referring to the drawings.

This device is placed on the animal by holding on the arms 4 and pulling outwardly on them, this pulls the rings 6 out and permits the holder to be inserted on the leg of the animal. When the holder is in position the tail is pushed into the space between the extending arms 4 and the sides of the U-shaped body 3, then the arms 4 are pushed inwardly thereby clamping the ends of the tail and the hooks 2 are placed in engagement with the sides of the U-shaped body 3 and are held there firmly in position.

It will be noted that the general action of this device is such that it has no detrimental or painful action on the animal, at the same time the extending arms enable one to get a substantial hold on this holder to place it in position or to remove it therefrom.

In general this device is very simple and is substantial in every way, and yet its cost of manufacture is comparatively low, and its efficiency is high.

There are no secondary parts in this device as it is made of only one piece of material, which makes it highly sanitary and at the same time reduces the liability of the device getting out of order. It will be noted that the tail is so held, that it is out of the way and close to the leg of the animal.

Having thus described the invention what is claimed is:

A holder of the class described comprising a single piece of wire having its central portion bent U-shaped, the wire at the end of said U-shaped portion being bent to form inwardly disposed rings, the wire at the ends of said rings being bent around the same adjacent to said U-shaped portion, and the end portions of the wire being extended backwardly and outwardly from said U-shaped portion and arranged to form means for opening said holder, said arms having hooks formed on their end portions and arranged to lock with the sides of said U-shaped portion.

In testimony whereof I hereunto affix my signature in the presence of two witnesses.

ARTHUR L. BARTLETT.

Witnesses:
  E. W. LONG,
  W. J. OLMSTED.